United States Patent [19]

Jennison et al.

[11] Patent Number: 5,073,995
[45] Date of Patent: Dec. 24, 1991

[54] UNIVERSAL TOILET TANK WATER SAVING DEVICE

[75] Inventors: Gregory F. Jennison, Crowley Lake; John C. Neubauer, Mammoth Lakes; Robert D. Baker, Bishop, all of Calif.

[73] Assignee: Neubauer-Jennison Construction, Mammoth Lakes, Calif.

[21] Appl. No.: 594,723

[22] Filed: Oct. 9, 1990

[51] Int. Cl.$^5$ .............................................. E03D 1/00
[52] U.S. Cl. ...................................................... 4/415
[58] Field of Search ..................... 4/324, 325, 326, 327, 4/394, 395, 415

[56] References Cited

U.S. PATENT DOCUMENTS

| | | | |
|---|---|---|---|
| 2,825,908 | 3/1958 | Tucker | 4/325 |
| 4,032,997 | 7/1977 | Phripp et al. | |
| 4,135,262 | 1/1979 | Overbey | 4/325 |
| 4,135,263 | 1/1979 | Anderson | 4/324 |
| 4,183,107 | 1/1980 | Hare et al. | |
| 4,216,555 | 8/1980 | Detjen | |
| 4,391,003 | 7/1983 | Talerico et al. | |
| 4,651,359 | 3/1987 | Battle | |
| 4,748,699 | 6/1988 | Stevens | |
| 4,882,793 | 11/1989 | Thompson | |

Primary Examiner—Charles E. Phillips
Attorney, Agent, or Firm—Christie, Parker & Hale

[57] ABSTRACT

A water saving device for a flush tank includes a floating body, a guide track on which the floating body is slidably mounted by a bracket, and a clip mounted to the guide track for snap fitting around a standpipe of the tank. The guide track is positioned so that the body is substantially directly above a flush valve of the tank, so that upon flushing the body will contact and forcibly close the flush valve to save water. The weight of the body is adjustable, as the body has an inner chamber for holding ballast and an inlet sealed by a removable plug. The guide track has breakoff segments at its bottom portion so that the track can be adapted to virtually any size tank. In another embodiment of the water saving device, the guide track is replaced by a small diameter tube through which the chain linking the flush valve and the flush lever attached to a flush handle is threaded. The body has a large tube attached to it which slidably fits over the standpipe.

11 Claims, 6 Drawing Sheets

UNIVERSAL TOILET TANK WATER SAVING DEVICE

BACKGROUND OF THE INVENTION

The invention relates to a toilet tank water saving device. More particularly, the invention is a water saving device for use in a toilet tank, which device prematurely closes a flapper valve of the tank to save flush water.

In recent years there has been widespread recognition of the need to save water. Several have addressed this need with regard to flush tanks, as reduction in flush water usage can be quite significant. Examples of such devices are in U.S. Pat. Nos. 4,748,699 (to Stevens), 4,216,555 (to Detjen), 4,651,359 (to Battle), 4,183,107 (to Hare, et.al.), 4,391,003 (to Talerico, et.al.), 4,882,793 (to Thompson), and 4,032,997 (to Phripp, et. al.).

The Stevens patent shows a flush water volume control system using a float with a central hole so that the float moves up and down along an overflow pipe. The bottom of the float has an actuator for contacting a flapper valve of the toilet tank. The vertical height of the float is adjustable, as the float has telescoping sections. There is also a hook settable to obtain a full flush by holding the float up. The telescoping member and hook result in a relatively complex system that generally is only of use in very deep tanks. The float must be installed over the standpipe. If the standpipe has another piece connected or extending into its upper end, installation requires disconnection and reconnection of such a piece.

The Battle patent discloses a flush valve actuation assembly which has a float and a lower portion for contacting the flapper valve. The assembly fits around the overflow pipe. The float holds water in it. As in the Stevens patent, the device installs over the standpipe and also has a hook to install. In addition, the Battle device is relatively long and therefore generally only useful in deep tanks.

The Detjen patent has an inverted cup-shaped float having an axially extending tube with a fork-like flapper valve actuator. The amount of flush water used is governed by the adjustable length of the tube. A standpipe is used to guide the float up and down. There is a magnetic coupling mechanism to hold the float up for a full flush. This system is quite complex, especially in its usage of the magnetic latch system and in its installation.

The Thompson patent is designed for a square over flow pipe. This is generally not applicable to american tanks.

The Hare patent generally only fits ball valve type tanks.

The Talerico, et.al. patent discloses a float that is relatively complicated in its structure and installation.

In view of the above, a relatively simple, reliable, inexpensive easy to install device which will fit in most, if not all, tanks is needed.

SUMMARY OF THE INVENTION

The invention is a simple, reliable, easy to install water saving device which fits in virtually all flush tanks.

The device has a floating body, an elongate guide track, a clip attached to the top of the guide track for snap fitting around a standpipe, and a bracket fixed to the floating body for slidably attaching to the guide track. The guide track has its upper end at about the height of the water in a full tank, and a lower portion proximate a valve cover of the flush tank such that the floating body is positioned over the valve cover. The guide track has break off portions at its lower end which can be removed to adjust the length of the track to the particular tank in which it is installed. In operation, when the tank is flushed, the body slides down the guide track as the water level decreases. The body contacts the valve cover to close it at a water level greater than the minimum water level which is normally required to close the valve cover.

In a preferred embodiment, the floating body includes a chamber and an inlet to the chamber sealed by a removable plug, so that the chamber can hold a variable amount of ballast. In a further embodiment of the invention, the floating body has a large tube attached to one side for fitting over the overflow tank. The body has a smaller tube attached at an opposite side. The chain that links the flush valve with the lever attached to the flush handle is threaded through the small tube to guide the floating body to the valve cover.

DETAILED DESCRIPTION

Figure 1:
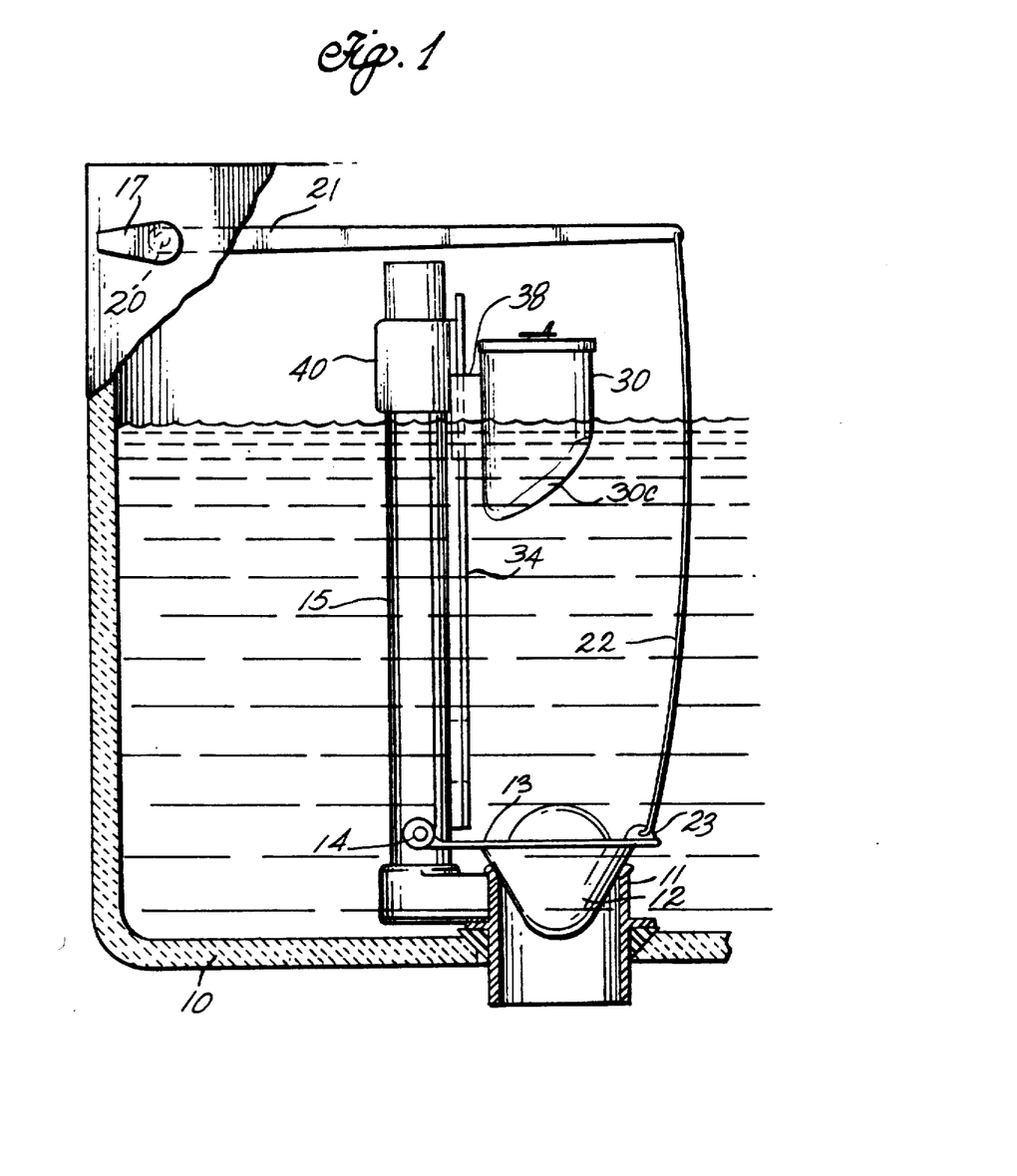
FIG. 1 is a side partial view of a flush tank in which the first embodiment of a water saving device according to the invention is installed, and the tank water is at its normal level.
Figure 2:
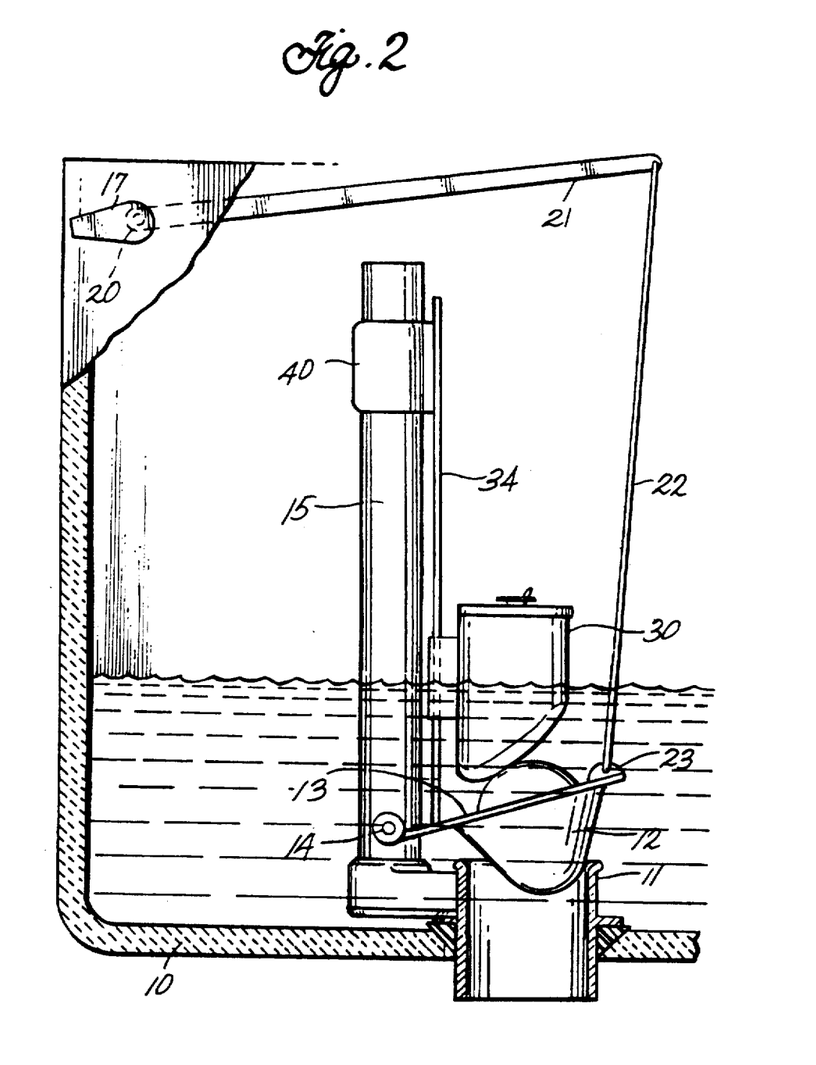
FIG. 2 is a view similar to FIG. 1, with the tank water at a level at which a floating body of the water saving device contacts the valve cover of the flush tank.
Figure 3:
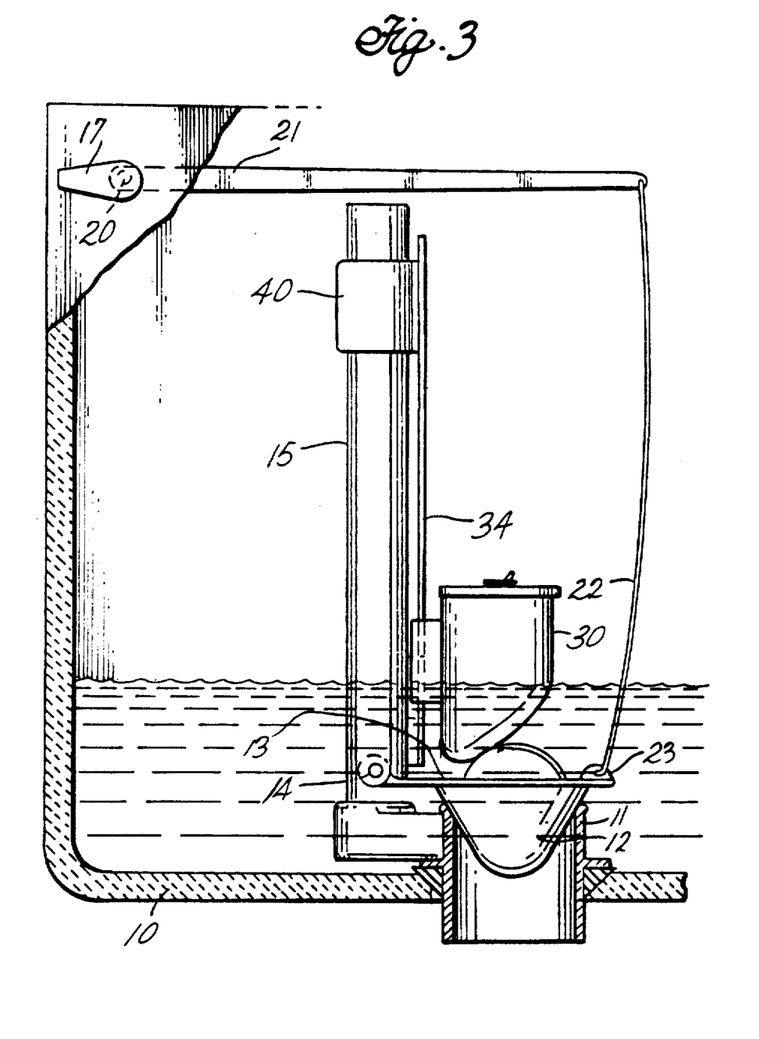
FIG. 3 is a view similar to FIG. 1, with the tank water at a level at which the floating body causes the valve cover to close.

The first embodiment of the invention will now be described. As shown in FIGS. 1—3, a typical toilet flush tank 10 has a flush outlet 11 normally closed by a flush ball 12 mounted on a resilient flexible flap 13 to form a valve cover. This valve cover is hinged at a point 14 where it connects to a standpipe 15 or overflow pipe for the tank. At its exterior, the tank 10 has a flush handle 17 mounted on a pivot 20 from which a conventional flush lever 21 extends inside the tank. The end of lever 21 has a chain or other link 22 connected to a bracket 23 on the flush valve. Depressing handle 17 lifts lever 21 and thus the flush valve through link 22 causing the tank water to flush through outlet 11.

The water saving device according to the invention is formed by a floating body 30, a guide rod or track 34, a mounting bracket 38 fixed to the body and slidably mounted on track 34, and a clip 40 for snap fitting around standpipe 15. The water saving device thus quickly mounts on the standpipe. Clip 40 is sized to snugly hold track 34 in position with its lower end proximate the valve cover and its upper end preferably just above the normal water level of the tank. In this position, body 30 is directly or substantially directly above the valve cover.

The water saving device operates in response to flushing the tank. The user depresses handle 17 thus lifting the valve cover and the water level in the tank decreases. Floating body 30 slides where the body collides with the valve cover, as shown in FIG. 2. The water level continues to decrease until the point shown in FIG. 3 where body 30 forces the valve cover closed. This water level is intermediate the normal water level of FIG. 1 and the tank's minimum water level at which a valve would normally close, thus saving flush water.

To properly operate the device, it is important that the lower end of the guide track be positioned so as not to interfere with valve cover operation. For example, care should be taken so as not to position the lower end of the guide track so as to wedge the valve cover open.

Figure 5:
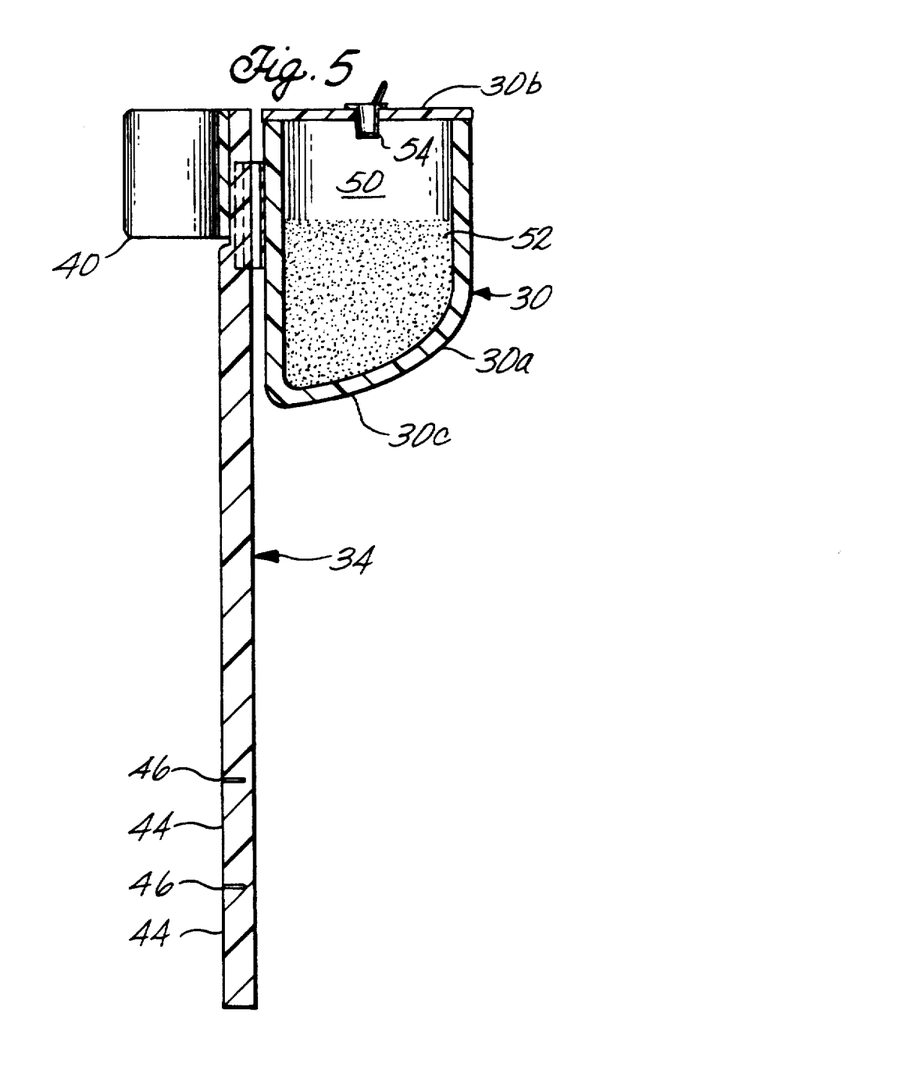
FIG. 5 is a vertical sectional view of the water saving device taken along line 5—5 of FIG. 4.

As the height of flush tanks varies, the length of the guide track may need to vary. Therefore, in accordance with the further aspect of the invention, the guide track has an adjustable length achieved through breakoffs 44 or segments defined by perforations 46, as shown best in the sectional view of FIG. 5.

Figure 4:
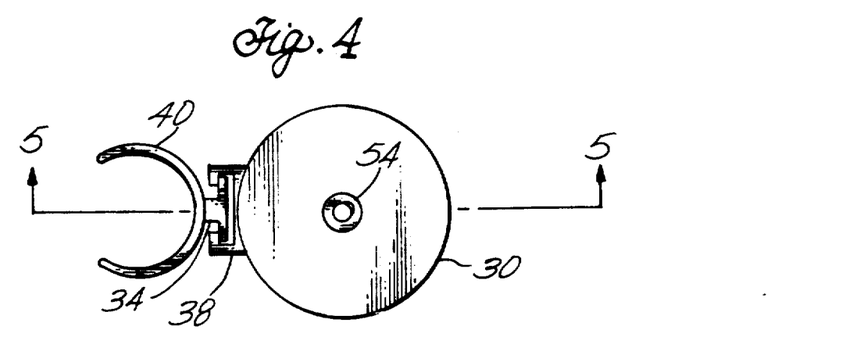
FIG. 4 is a top view of the water saving device according to FIG. 1.

With additional reference to the top view of FIG. 4, further details of the water saving device according to the invention are evident. Body 30 has a chamber 50 for holding ballast such as sand 52 or liquid. The removable plug 54 seals an aperture in body 30. Such a ballast can be added or removed to adjust the weight of the body. Body 30 may be unitary or multiple parts such as an open top member 30a and a cover 30b fixed to it.

Bracket 38 is fixed to body 30 and fits slidably around guide track 34. Guide track 34 has a T-shaped section, the stem of the T being shorter and wider at the top to provide a surface for fixing clip 40. The stem of the T may be one piece with the rest of guide track 34 or separate, and the width of the stem can be widened at the top by fixing additional members to each side of the stem allowing the rest of the stem to have a uniform width.

One of ordinary skill in the art will appreciate that a wide range of materials are suitable for the device, especially plastics. The body 30, guide track 34, bracket 38 and clip 40 are preferably made of ABS or PVC plastic.

As the body does not mount directly on the overflow pipe, it is made relatively small so that it will fit in most, if not all, tanks. Some preferred approximate dimensions of the system are as follows: the inner diameter of clip 40 is 1.05" and its opening is 0.85". The length of guide track 34 is 7.5", and each breakoff is 1". The width of track 34 is 0.525" and the narrow stem of the T-shaped section of the track are 0.075". The outer diameter of body 30 is 1.875" and the curvature of bottom surface 30c where it joins the rest of open topped member 30a is 0.5" radius. The height of body 30 is 2.75". The inner width of bracket 38 is 0.55", and its opening is 0.25". The bracket is 1.2" long, its top 0.5" below the top of body 30 and its bottom 1" above the bottom of body 30.

The water saving device operates when a user flushes the tank by pressing handle 17 to lift the valve cover. The water level goes down from FIG. 1, to that of FIG. 2 and body 30 goes down with it along guide 34. The body contacts the valve cover at its slanted surface 30c. Water level continues to fall until the body forces the valve cover closed. The tank begins re-filling and the body goes up along guide 34 to return to the position of FIG. 1. To obtain a full flush, the user simply holds the flush handle down for a period of several seconds until the water level reaches its minimum, as the holding down of the flush valve forcibly holds up the valve cover against the weight of body 30.

The exact weight of body 30 is not critical, but preferably is about 2½ to b 4 ounces, including any ballast 52, and most preferably is about 3 ounces. To save more water, the weight can be increased. To achieve a greater flush, the weight should be decreased.

The water saving device according to the invention has a simple structure and guide system. The guide system is separate from the standpipe to allow quick attachment to the standpipe and reliable operation to close the flush valve, yet a very simple structure for the body. The body need not be constructed so as to fit around the standpipe. This structure allows easy installation by the sole step of snapping clip 40 in place around the standpipe. Mounting the floating body to a guide system which in turn is mounted to the overflow tank not only simplifies the structure of the body but enables the body to have a relatively small size and to fit in the space directly above the flush valve. This further ensures that the water saving device according to the invention will fit in most any tank. Moreover, the guide track has break off segments which also contribute to the universal acceptance of the water saving device according to the invention.

Figure 6:
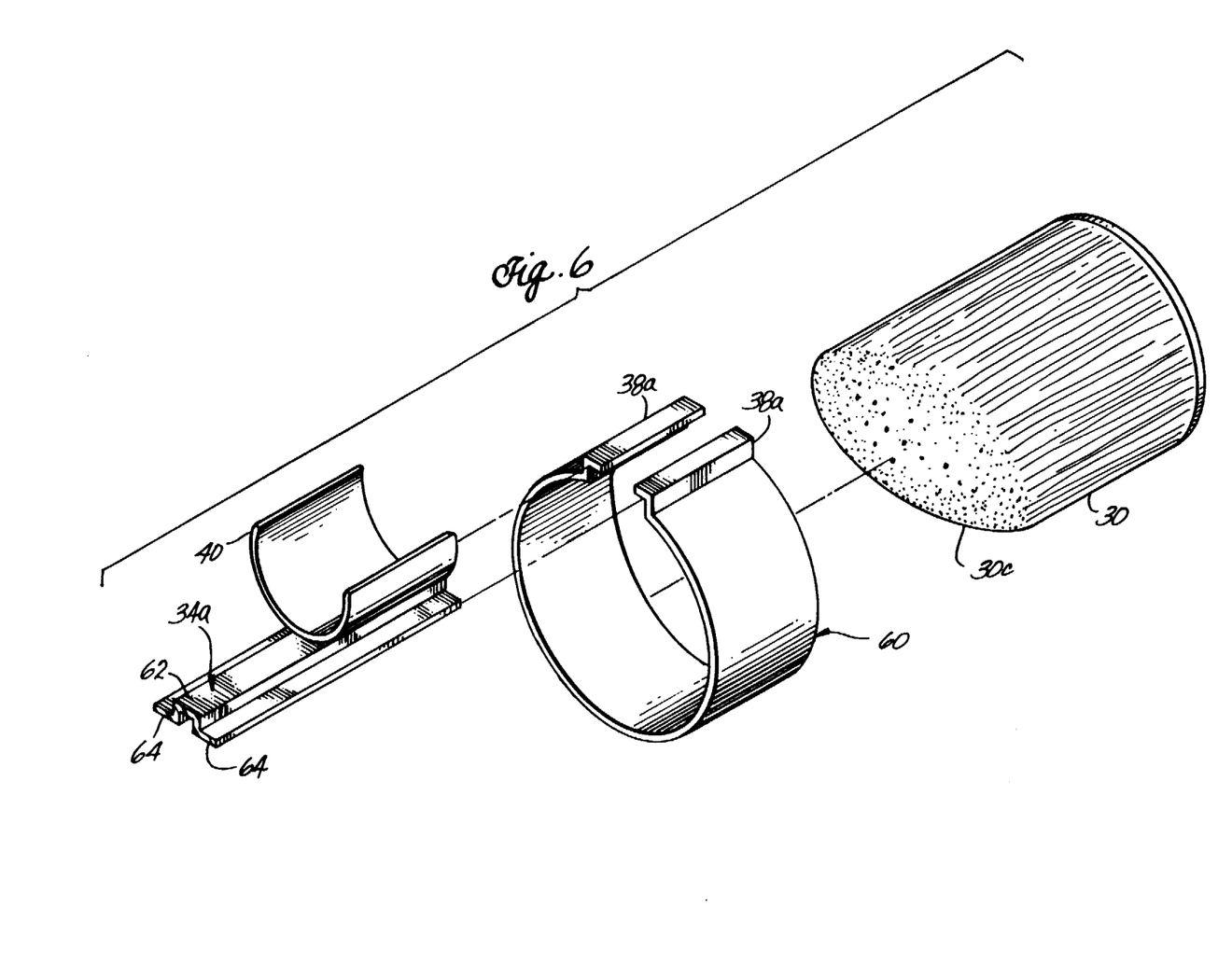
FIG. 6 is an exploded perspective view of a water saving device according to a second embodiment of the invention.

Another embodiment of the invention is shown in the partial, exploded perspective view of FIG. 6. Body 30 is the same as in the previous embodiment; however, it is fitted and fixed inside a mounting ring 60 having mounting 10 flanges 38a. A guide track 34a has a U-shaped section portion 62 and flange portions 64. Mounting flanges 38a slidably fit around the flange portion 64. Clip 40 snap fits around a standpipe such as that of FIGS. 1-3. The invention is otherwise the same as the previous embodiment. The guide track 34a may include breakoffs as in the previous embodiment.

Figure 7:
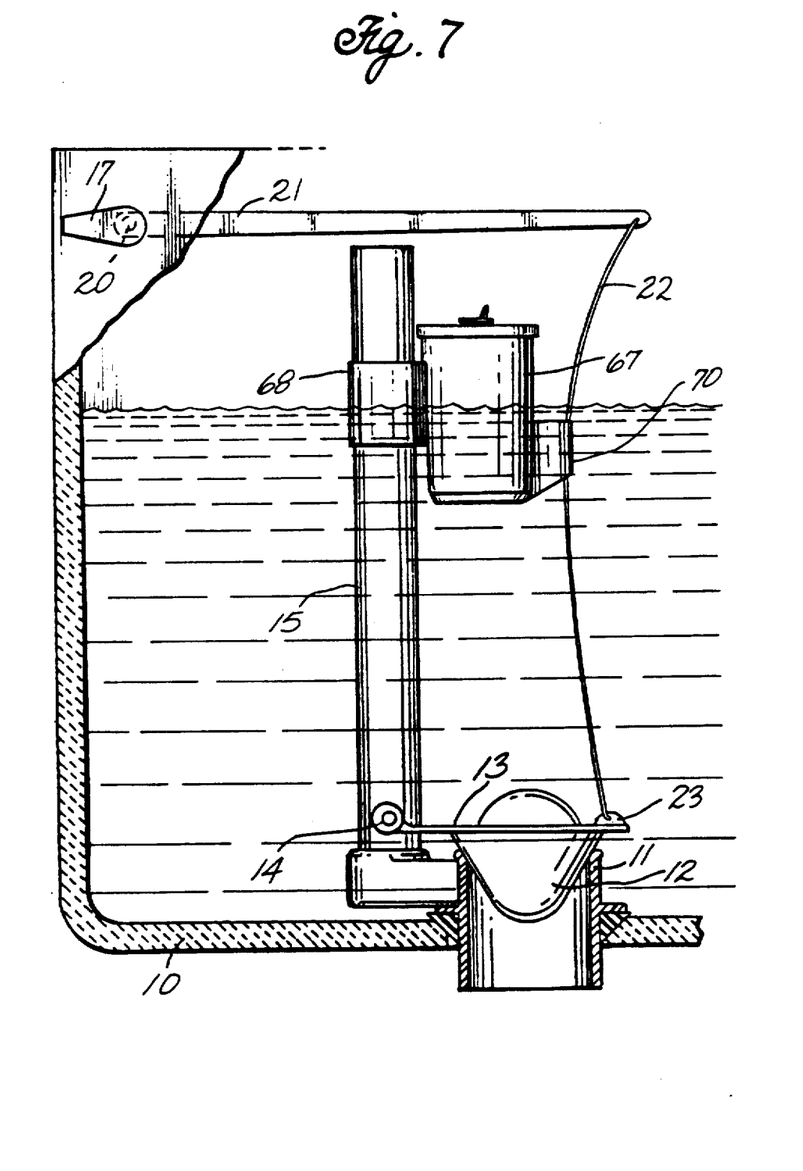
FIG. 7 is a view similar to FIG. 1 of a water saving device according to a third embodiment.

A further embodiment is shown in FIG. 7, in which a body 67 is guided by line 22 without the use of a guide track. Body 67 is similar to body 30 of FIG. I, but has a flatter bottom. However, the slanted bottom of FIG. 1 could be used. Body 67 has a mounting tube 68 fixed to it, such that the tube fits around the standpipe. Instead of using a guide track, in this embodiment body 67 has a relatively small diameter tube 70 through which line 22 threads (by unhooking and rehooking it to lever 21).

All of the embodiments of the invention result in a simple, easy to install system. The body is simple to construct as it is not mounted around the standpipe. In fact, the body can be relatively small so that its structure can fit in virtually all tanks. The first two embodiments have a further advantage of one step installation by snap fitting, while the third embodiment has the advantage of using the chain to guide the floating body. Thus, in the third embodiment, the guide track is eliminated.

The invention is not limited to the disclosed embodiments. Rather, the invention is defined by the appended claims, which are intended to cover variations of the disclosed embodiment which are within the spirit and scope of the invention.

What is claimed is:

1. In a flush tank containing water and having an outlet valve with a normally closed valve cover to maintain a normal water level, a handle for opening the valve cover to release water from the tank, a vertical standpipe with a lower end adjacent the valve cover and an upper end at least at a normal water level, wherein the valve cover closes in response to a decrease in water level to a minimum, the improvement comprising:

a floating body;

an elongate guide track having a T-shaped section, the T-shaped section being defined by a stem and a cross member;

means for fixedly attaching an upper end of the guide track to the standpipe; and means for slidably attaching the floating body around the cross member of the T-shaped section of the guide track, wherein the guide track is disposes with its lower end adjacent the valve cover such that the body is positioned over the valve cover, whereby, in response to release of water, the body slides down the guide track and contacts the valve cover to thereby close the valve cover at an intermediate water level between the water level minimum and the normal water level.

2. The flush tank of claim 1, wherein the body comprises means for changing its weight to adjust the intermediate water level at which the body contacts the valve cover.

3. The flush tank of claim 2 wherein the means for changing comprises a chamber formed in the body, an inlet to the chamber and a removable plug for the inlet, wherein the chamber is adapted to hold ballast.

4. The flush tank of claim 1, wherein the guide track comprises means for adjusting its length.

5. The flush tank of claim 4, wherein the means for adjusting comprises removable segments of the guide track.

6. The flush tank of claim 5, wherein the removable segments are defined by perforations.

7. The flush tank of claim 1 wherein the means for attaching the guide track is removable.

8. The flush tank of claim 7, wherein the means for removably attaching the guide track to the standpipe comprises a clip for snap fitting around the standpipe.

9. The flush tank of claim 1, wherein the means for slidably attaching the body to the guide track is removable from the guide track.

10. In a flush tank containing water and having an outlet valve with a normally closed valve cover to maintain a normal water level, a handle for opening the valve cover to release water from the tank, a vertical standpipe with a lower end adjacent the valve cover and an upper end at least at a normal water level, wherein the valve cover closes in response to a decrease in water level to a minimum, the improvement comprising:

a floating body;

an elongate guide track;

means for fixedly attaching an upper end of the guide track to the standpipe; and means for slidably attaching the floating body to the guide track, wherein the guide track is disposes with its lower end adjacent the valve cover such that the body is positioned over the valve cover, whereby, in response to release of water, the body slides down the guide track and contacts the valve cover to thereby close the valve cover at an intermediate water level between the water level minimum and the normal water level, wherein the guide track comprises means forming removable segments for adjusting its length.

11. The flush tank of claim 10, wherein the removable segments are defined by preforations.

* * * * *

UNITED STATES PATENT AND TRADEMARK OFFICE
CERTIFICATE OF CORRECTION

PATENT NO. : 5,073,995

DATED : December 24, 1991

INVENTOR(S) : G. F. Jennison; J. C. Neubauer; R. D. Baker

It is certified that error appears in the above-identified patent and that said Letters Patent is hereby corrected as shown below:

Column 2, line 30, change "FIG. I" to -- FIG. 1 --.

Column 3, line 7, after "slides" and before "where" insert -- downward as the water level decreases to a point --.

Column 4, line 7, change "2½ to b 4" to -- 2½ to 4 --.
Column 4, line 33, before "flanges" delete "10".
Column 4, line 42, change "FIG. I" to -- FIG. 1 --.

Column 5, line 16, after "track is" change "disposes" to -- disposed --.

Column 6, line 26, after "track is" change "disposes" to -- disposed --.

Signed and Sealed this

Thirteenth Day of April, 1993

Attest:

STEPHEN G. KUNIN

Attesting Officer  Acting Commissioner of Patents and Trademarks